(12) United States Patent
White

(10) Patent No.: US 8,374,916 B2
(45) Date of Patent: Feb. 12, 2013

(54) SECURE MOBILE-BASED FINANCIAL TRANSACTIONS

(75) Inventor: Spencer Neil White, Norcross, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 167 days.

(21) Appl. No.: 12/606,243

(22) Filed: Oct. 27, 2009

(65) Prior Publication Data

US 2011/0099079 A1   Apr. 28, 2011

(51) Int. Cl.
*H04M 3/16* (2006.01)
*H04M 1/68* (2006.01)
*G06Q 20/00* (2012.01)

(52) U.S. Cl. ............... 705/17; 705/16; 705/21; 705/41; 705/67; 455/410; 455/411; 455/414.2

(58) Field of Classification Search .................. 455/410, 455/41.1, 550.1, 411, 414.2; 705/17, 30, 705/41, 27, 44, 13, 75, 18, 72, 67, 16, 76, 705/26.1, 35; 713/184, 182
See application file for complete search history.

(56) References Cited

U.S. PATENT DOCUMENTS

| | | | |
|---|---|---|---|
| 5,221,838 A * | 6/1993 | Gutman et al. ............... 235/379 |
| 7,427,033 B1 * | 9/2008 | Roskind ......................... 235/492 |
| 2002/0046189 A1 * | 4/2002 | Morita et al. ................... 705/67 |
| 2002/0065774 A1 * | 5/2002 | Young et al. .................... 705/41 |
| 2003/0055785 A1 * | 3/2003 | Lahiri ............................. 705/41 |
| 2004/0039919 A1 * | 2/2004 | Takayama et al. ............ 713/180 |
| 2004/0267618 A1 * | 12/2004 | Judicibus et al. ............... 705/16 |
| 2006/0041759 A1 * | 2/2006 | Kaliski et al. ................. 713/184 |
| 2006/0224470 A1 * | 10/2006 | Garcia Ruano et al. ........ 705/27 |
| 2007/0108269 A1 * | 5/2007 | Benco et al. ................... 235/380 |
| 2007/0233615 A1 * | 10/2007 | Tumminaro ..................... 705/75 |
| 2007/0293202 A1 * | 12/2007 | Moshir et al. ............... 455/414.2 |
| 2008/0005576 A1 * | 1/2008 | Weiss ............................. 713/182 |
| 2008/0103984 A1 * | 5/2008 | Choe et al. ...................... 705/76 |
| 2008/0108324 A1 * | 5/2008 | Moshir et al. .................. 455/411 |
| 2008/0201212 A1 * | 8/2008 | Hammad et al. ................ 705/13 |
| 2008/0208681 A1 * | 8/2008 | Hammad et al. ................ 705/13 |
| 2008/0208759 A1 * | 8/2008 | Royyuru ......................... 705/72 |
| 2008/0223918 A1 * | 9/2008 | Williams et al. .............. 235/379 |
| 2009/0055319 A1 * | 2/2009 | Raheman ......................... 705/44 |
| 2009/0063312 A1 * | 3/2009 | Hurst .............................. 705/30 |
| 2009/0104888 A1 * | 4/2009 | Cox .............................. 455/410 |
| 2010/0051686 A1 * | 3/2010 | Obi ................................ 235/379 |
| 2010/0099380 A1 * | 4/2010 | Chen ............................. 455/411 |
| 2010/0125510 A1 * | 5/2010 | Smith et al. ..................... 705/17 |
| 2010/0125516 A1 * | 5/2010 | Wankmueller et al. ......... 705/35 |
| 2010/0138344 A1 * | 6/2010 | Wong et al. ..................... 705/44 |

(Continued)

OTHER PUBLICATIONS

Gonzalez, D. (2002). Working without a net. Security Management, 46(6), 115-120. Retrieved from http://search.proquest.com/docview/231155604?accountid=14753.*

*Primary Examiner* — Matthew Gart
*Assistant Examiner* — Olusegun Goyea
(74) *Attorney, Agent, or Firm* — Moazzam & Associates, LLC

(57) ABSTRACT

Devices, systems and methods are disclosed which relate to securing payments from a mobile communications device. In exemplary embodiments, a mobile communications device communicates with a payment server via a point-of-sale device to conduct a transaction. The mobile communications device uses a client payment logic to send payment information to the point-of-sale device. The point-of-sale device uses a vendor payment logic to forward the payment information to the payment server. The payment server verifies the payment information and sends confirmation to the point-of-sale device.

19 Claims, 6 Drawing Sheets

U.S. PATENT DOCUMENTS

| | | | |
|---|---|---|---|
| 2010/0257097 A1* | 10/2010 | Saban | 705/44 |
| 2010/0274677 A1* | 10/2010 | Florek et al. | 705/16 |
| 2010/0299220 A1* | 11/2010 | Baskerville et al. | 705/26 |
| 2010/0320266 A1* | 12/2010 | White | 235/375 |
| 2011/0078031 A1* | 3/2011 | Mardikar et al. | 705/17 |
| 2011/0088085 A1* | 4/2011 | Novak | 726/7 |
| 2011/0099079 A1* | 4/2011 | White | 705/17 |
| 2011/0197266 A1* | 8/2011 | Chu et al. | 726/5 |
| 2012/0130838 A1* | 5/2012 | Koh et al. | 705/26.1 |

* cited by examiner

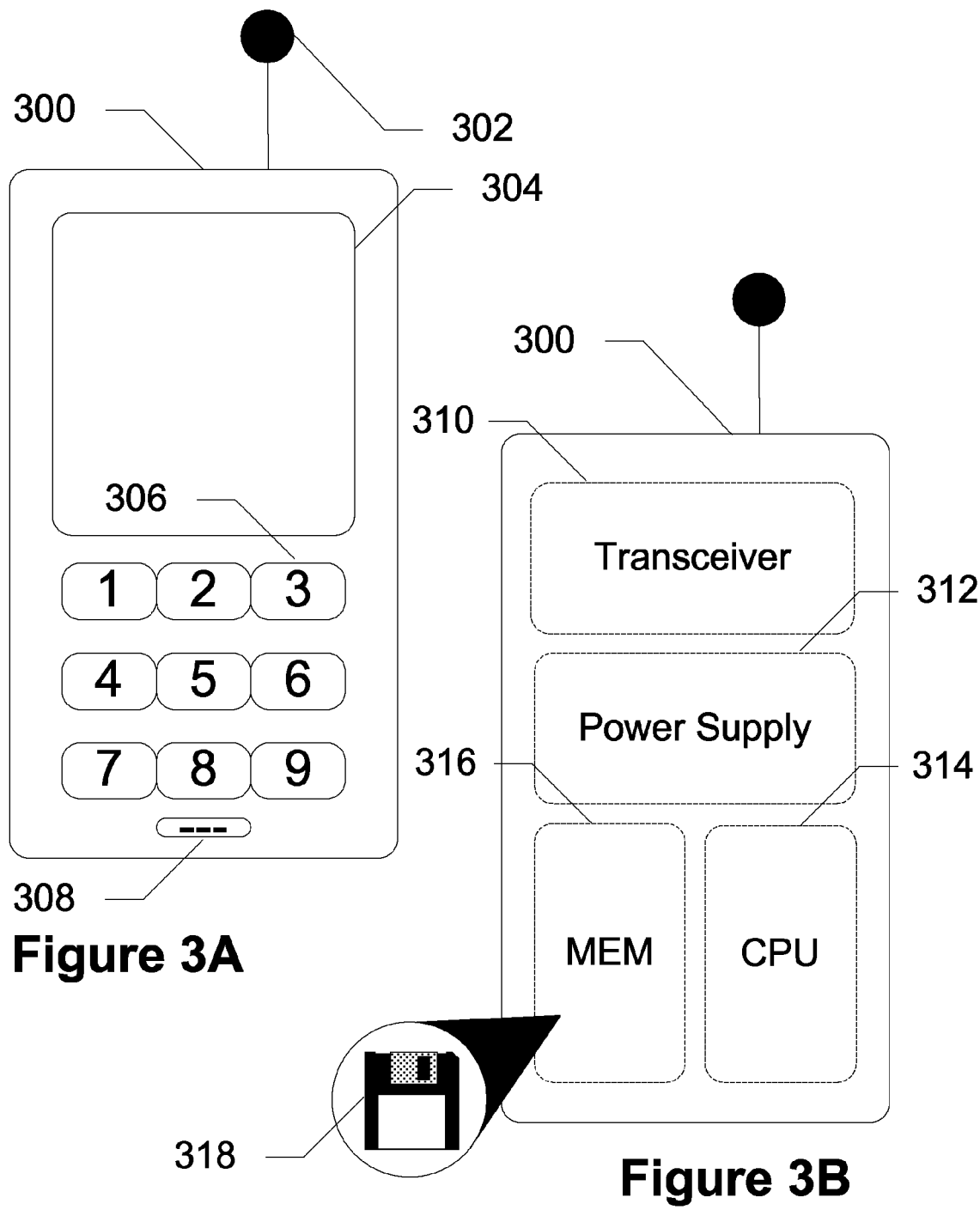

SECURE MOBILE-BASED FINANCIAL TRANSACTIONS

BACKGROUND OF THE INVENTION

1. Field of the Invention

The present invention relates to communications devices. More specifically, the present invention relates to secure financial transactions on mobile communications devices.

2. Background of the Invention

Wireless communications devices, such as cellular telephones, have become tremendously popular. It is estimated that there were 3.3 billion cellular phone subscriptions at the end of 2007. Close to 80% of the world now enjoys cellular coverage, a figure only increasing as new networks appear. Along with the abundance of cellular telephones comes the demand for new and improved services. It is no longer enough to just place and receive calls, users want it all.

With the pervasive use of mobile devices, these devices are being used in all aspects of life. Not only are mobile devices used for placing telephone calls, they have become mobile computers. However, as the number of devices and their uses has increased, so has the amount of personal information stored on the devices. Mobile devices may contain files such as personal contacts, messages, documents, and even financial information.

The dominant form of electronic payment today is a magnetic stripe credit card. With these types of cards, the purchaser or the merchant swipes the magnetic stripe through a reader. The magnetic stripe contains account information and other pieces of security code and identification that is captured in the swiping process. This information is sent through the merchant's point-of-sale systems through terrestrial networks. Depending on what type of payment product is used, the information may go through a VISA router, MASTERCARD router, etc., until it ultimately ends up at a payment processor that represents the bank that issued the payment product. The payment processor runs logic behind the scenes to validate that the credit card is an authorized card and that there is either sufficient money in the bank account or a sufficient credit line to support that transaction. The payment processor then returns an authorization code back through the terrestrial networks to the merchant systems to either approve or decline the transaction.

Electronic payments are slowly migrating from the magnetic stripe to a contactless or near-field-communication (NFC) transaction. Contactless transacting is likely to be the dominant form for mobile payments in the future. However, the availability of personal and financial information on mobile devices makes these devices a target for criminals. Hacking this information may allow a criminal to make purchases and charge them to the customer of the hacked device.

With this possibility, many mobile device owners may be afraid to use their device to its fullest capabilities. Merchants may be afraid to accept transactions for fear that they may not be legitimate. What is needed is a way to make purchases from a mobile device without risking the loss of financial information.

SUMMARY OF THE INVENTION

The present invention provides for systems and methods for securing payments from a mobile communications device. In exemplary embodiments, a mobile communications device communicates with a payment server via a point-of-sale device to conduct a transaction. The mobile communications device uses a client payment logic to send payment information to the point-of-sale device. The point-of-sale device uses a vendor payment logic to forward the payment information to the payment server. The payment server verifies the payment information and sends confirmation to the point-of-sale device.

A one-time digital key limits a hacker to a single transaction. This one-time digital key is sent to the mobile communications device and is required to complete a transaction. The one-time digital key is replaced with a new digital key after each transaction. Furthermore, the payment server gives customers an option to set a payment cap for a single transaction. Therefore a customer can control the full potential for theft. A customer using embodiments of the present invention can also conduct a transaction outside of network coverage by using near field communication (NFC) to communicate with the point-of-sale device. The point-of-sale device acts as an intermediary for the mobile communications device to communicate with the payment server through the point-of-sale device's connection. In other embodiments a customer uses their home computer connected through a web portal to conduct a secure transaction.

In one exemplary embodiment, the present invention is a system for securely processing transactions. The system includes a mobile communications device having a client payment logic, a point-of-sale device in communication with the mobile communications device, the point-of-sale device having a vendor payment logic, and a payment server in communication with the mobile communications device through a first connection and the point-of-sale device through a second connection, the payment server having a server payment logic. The server payment logic sends a one-time digital key to the mobile communications device, receives a payment number and an amount from the point-of-sale device, and deducts the amount from an account associated with the mobile communications device.

In another exemplary embodiment, the present invention is a method of securely processing a payment. The method includes sending a one-time digital key to a mobile communications device, receiving a payment number, an ID number, and an amount, and deducting the amount from an account associated with the mobile communications device. The mobile communications device receives the one-time digital key and generates the payment number.

In yet another exemplary embodiment, the present invention is a method of securely processing a payment. The method includes receiving a one-time digital key from a payment server, generating a payment number from the one-time digital key, and sending a payment number, an ID number, and an amount, to a payment server. The payment server deducts the amount from an account associated with the mobile communications device.

BRIEF DESCRIPTION OF THE DRAWINGS

FIGS. 3A and 3B show a mobile communications device for secure payments, according to an exemplary embodiment of the present invention.

DETAILED DESCRIPTION OF THE INVENTION

Figure 1:
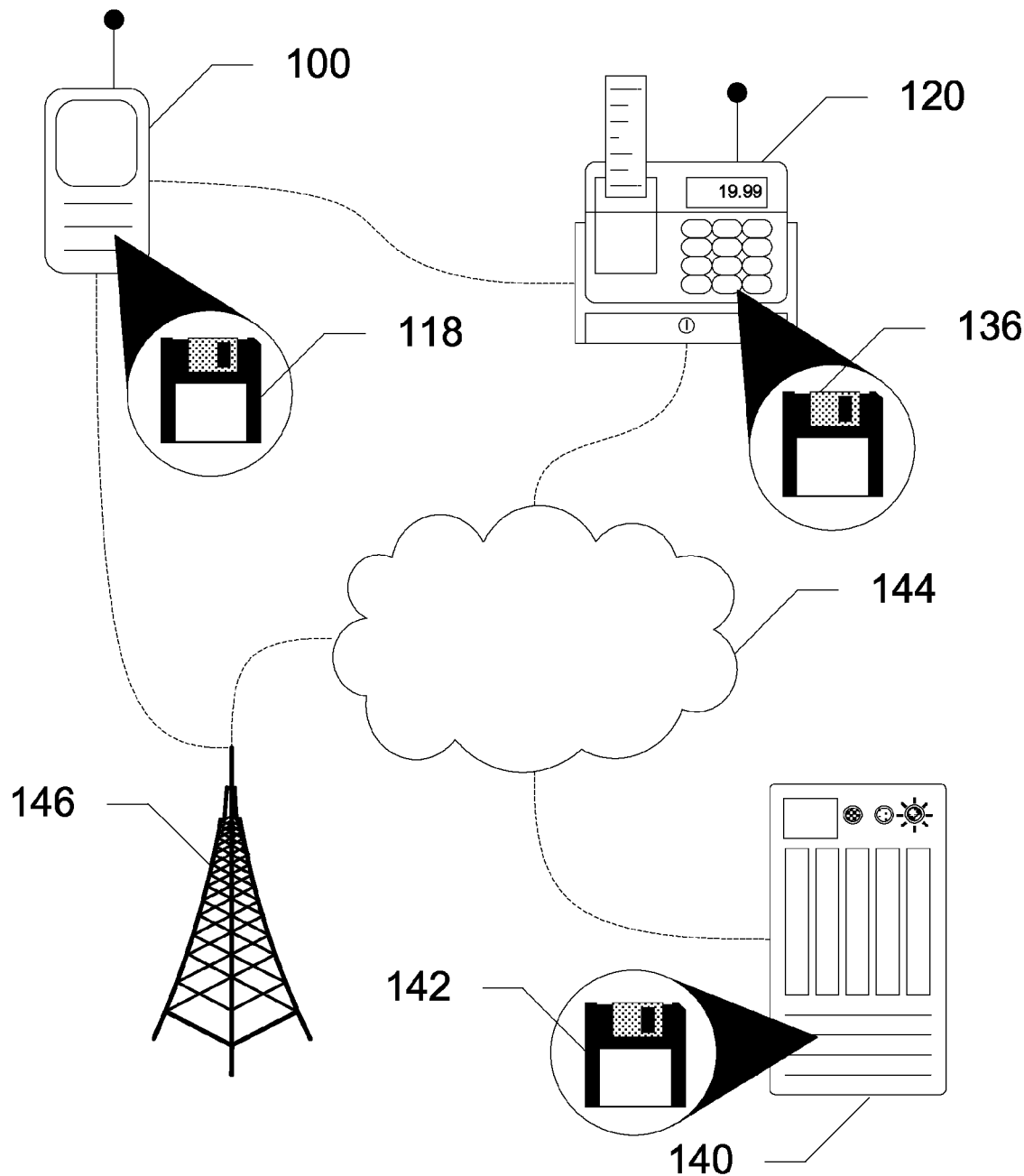
FIG. 1 shows a system for securing payment from a mobile communications device, according to an exemplary embodiment of the present invention.

The present invention provides for systems and methods for securing payments from a mobile communications device. In exemplary embodiments, a mobile communications device communicates with a payment server via a point-of-sale device to conduct a transaction. The mobile communications device uses a client payment logic to send payment information to the point-of-sale device. The point-of-sale device uses a vendor payment logic to forward the payment information to the payment server. The payment server verifies the payment information and sends confirmation to the point-of-sale device.

The approach combines a unique one-time digital key with a number generator algorithm to make a payment from a mobile wallet on a mobile communications device. The one-time digital key, in the form of a multi-digit number, is effectively multiplied by the number generator algorithm to create a payment number, which is sent to a payment server along with a payment request and an amount. The payment server receives the payment request with the payment number and the amount. The payment server includes an identical number generator algorithm. Thus, the payment server can separate the one-time digital key from the generated number. The payment server confirms the generated number and one-time digital key are correctly associated with the customer and allows a payment to proceed to a vendor. When a payment proceeds with the one-time digital key, the payment server automatically sends the next digital key to the mobile communications device to be stored there until the next transaction is processed.

In embodiments of the present invention, single transactions may be capped to prevent the customer from being charged massive amounts if the mobile communications device is hacked and the one-time digital key and algorithm are stolen. This cap may be set by the customer or be a default value. Amounts in excess of the capped value may require a confirmation by the customer, such as by a telephone call, text message, instant message, etc.

In embodiments of the present invention, a mobile communications device can make a payment and receive a new one-time digital key even when not connected to a cellular network. A point-of-sale device with near field communications capabilities, such as BLUETOOTH, may transfer a new one-time digital key to the customer's mobile communications device in an encrypted message. The encryption may ensure that only the correct authorized mobile communications device is able to access the new one-time digital key. By leveraging this approach, if someone where able to hack the mobile communications device, the hacker would at most be able to process one transaction before the generated numbers would be out of sequence from those expected by the payment server. Further, since the new one-time digital key is sent automatically, behind the scenes each time a legitimate transaction is processed, the new one-time digital key is stored on the mobile communications device in advance of the next need, thereby eliminating the "out of coverage" dilemma. For customers having more security, some exemplary embodiments send more than one one-time digital key from the payment server at once. All of these one-time digital keys may be necessary to process a transaction.

"Mobile communications device," as used herein and throughout this disclosure, refers to any portable device capable of sending and receiving information through a wireless network. Examples of a mobile communications device include cellular telephones, smart phones, notebook computers, tablet computers, personal digital assistants (PDAs), etc.

"Point-of-sale device", as used herein and throughout this disclosure, refers to any device capable of conducting a transaction including communicating with a network. Examples of a point-of-sale device include an electronic cash register, a kiosk, a computer conducting a transaction through a web portal, etc.

"Logic", as used herein and throughout this disclosure, refers to any information having the form of instruction signals and/or data that may be applied to affect the operation of a processor. Examples of processors are computer processors (processing units), microprocessors, digital signal processors, controllers and microcontrollers, etc. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS (electrically erasable programmable read-only memories). Logic may also be comprised by digital and/or analog hardware circuits, for example, hardware circuits comprising logical AND, OR, XOR, NAND, NOR, and other logical operations. Logic may be formed from combinations of software and hardware.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system for securing payment from a mobile communications device 100, according to an exemplary embodiment of the present invention. In this embodiment, the system includes mobile communications device 100, a point-of-sale device 120, a network 144, a payment server 140, and a cellular tower 146. Mobile communications device 100 includes a client payment logic 118 which, among other functions, generates a random number according to an algorithm. Client payment logic 118 also combines the random number with a one-time digital key. The combining may include multiplying the numbers, appending one number to the other, mixing the numbers, adding the numbers, subtracting the numbers, etc. Mobile communications device 100 receives the one-time digital key from payment server 140 through network 144. Mobile communications device 100 may communicate wirelessly with point-of-sale device 120 or may communicate in a wired fashion through a port. Mobile communications device 100 may also communicate wirelessly with payment server 140 over network 144 through cellular tower 146. Point-of-sale device 120 may be an electronic cash register, a mall kiosk, etc. Point-of-sale device 120 totals an amount for a sale of goods or services for a customer to purchase. Point-of-sale device 120 contains a vendor payment logic 136 which contains instructions for sales, transmission, etc. Vendor payment logic 136 may also include instructions for sending mobile communications device 100 a new one-time digital key when mobile communications device 100, for instance, is not connected to a cellular network. Point-of-sale device 120 communicates this amount to mobile communications device 100 either directly or through payment server 140. Mobile communications device 100 receives this amount and communicates a payment number and the amount to payment server 140. This payment number is a combination of the one-time digital key and the random number. Payment server 140 receives the payment number and the amount from mobile communications device 100. In alternate embodiments the payment number is routed through network 144 or through point-of-sale device 120. Payment server 140 contains a server payment logic 142. Server payment logic 142 includes a random number generating algorithm that is identical to that included in client payment logic 118 of mobile communications device 100. Server payment logic 142 disassembles the payment number into its components, the one-time digital key and random number, and verifies that each of these is correct. Payment server 140 knows the one-time digital key in use and has the same random number from the random number generator as well as the method in which the two were combined. Thus, payment logic 142 is able to disassemble the payment number and verify the two numbers or codes. If the numbers or codes match, payment server 140 deducts the amount from an account associated with mobile communications device 100, and sends a confirmation to point-of-sale device 120.

Figure 2A:
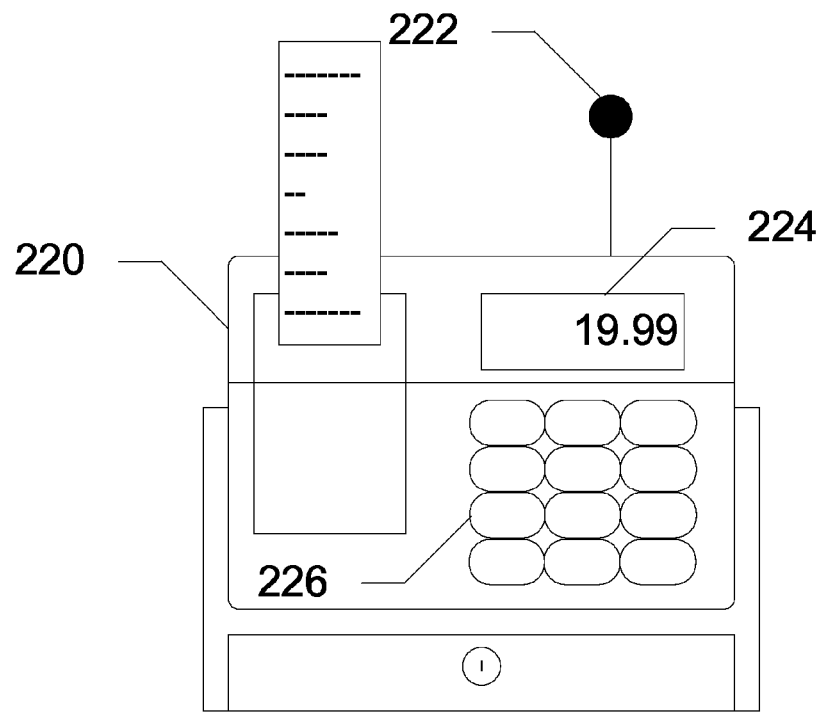
FIGS. 2A and 2B show a point-of-sale device, according to an exemplary embodiment of the present invention.
Figure 2B:
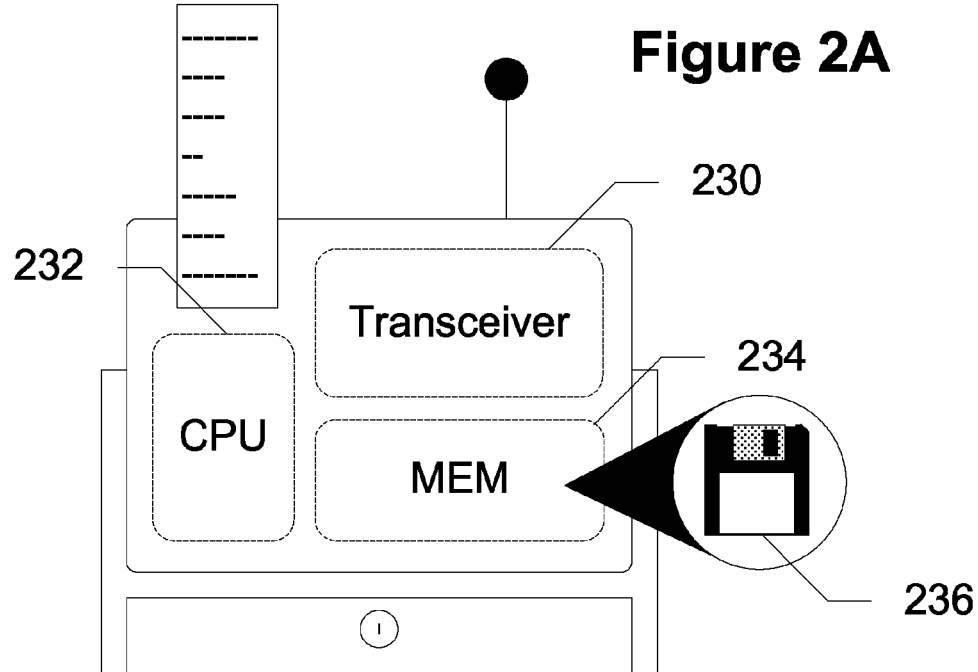

FIGS. 2A and 2B show a point-of-sale device 220, according to an exemplary embodiment of the present invention. In this embodiment, point-of-sale device 220 is similar to a cash register, including an antenna 222, a display 224, a keypad 226, a transceiver 230, a central processing unit (CPU) 232, and a memory 234. Antenna 222 amplifies signals to and from transceiver 230, allowing point-of-sale device 220 to communicate with a mobile communications device, a server, a network, etc. Transceiver 230 may communicate using wireless signals, such as cellular radio frequency (RF) signals, WiFi, BLUETOOTH, infrared (IR), etc. Keypad 226 allows a vendor to input items purchased by a customer. Keypad 226 may also allow vendor to input a location of the mobile communications device making a payment, etc. CPU 232 commands components of point-of-sale device 220 including instructions from a vendor payment logic 236 on memory 234. Vendor payment logic 236 includes instructions for sales, transmissions, etc.

In alternate embodiments the point-of-sale device is a kiosk. A customer may input items or services to be purchased into the kiosk. The kiosk may be at a mall or other public venue. The kiosk communicates with the mobile communications device to receive a payment number. The kiosk forwards the payment number along with an amount reflecting the total of input items and/or services to the payment server. In some embodiments a user's home computer may function as a point-of-sale device. In these exemplary embodiments a computer conducts a transaction through a web portal or other network connection. The computer communicates with the mobile communications device to receive a payment number. The computer forwards the payment number through the web portal, where the payment number is joined with the amount, to the payment server.

FIGS. 3A and 3B show a mobile communications device 300 for secure payments, according to an exemplary embodiment of the present invention. In this embodiment, mobile communications device 300 includes an antenna 302, a display 304, a keypad 306, a microphone 308, a memory 316, a power supply 312, a central processing unit (CPU) 314, and a transceiver 310. Display 304 is an LCD or LED screen on which a customer can view payment instructions, payment amounts, selections, numbers, letters, etc. Antenna 302 is a transducer designed to transmit or receive electromagnetic waves. Microphone 308 allows the customer to verbally communicate with others using mobile communications device 300. Keypad 306 allows the customer to enter letters, numbers, and symbols in order to send payments, dial telephone numbers, create text messages or e-mails, etc. Transceiver 310 allows mobile communications device 300 to wirelessly communicate with a payment server, a point-of-sale device, a network, other wireless devices, etc. This communication may be through cellular radio frequency (RF) signals, WiFi, BLUETOOTH, infrared (IR), etc. Power supply 312 provides power to each of the components of mobile communications device 300. CPU 314 commands components of mobile communications device 300 according to a client payment logic 318 on memory 316. Memory 316 stores logic, data, digital keys, etc. Client payment logic 318 includes a random number generating algorithm, instructions for combining a random number with a one-time digital key, instructions for transmission, etc.

Figure 4:
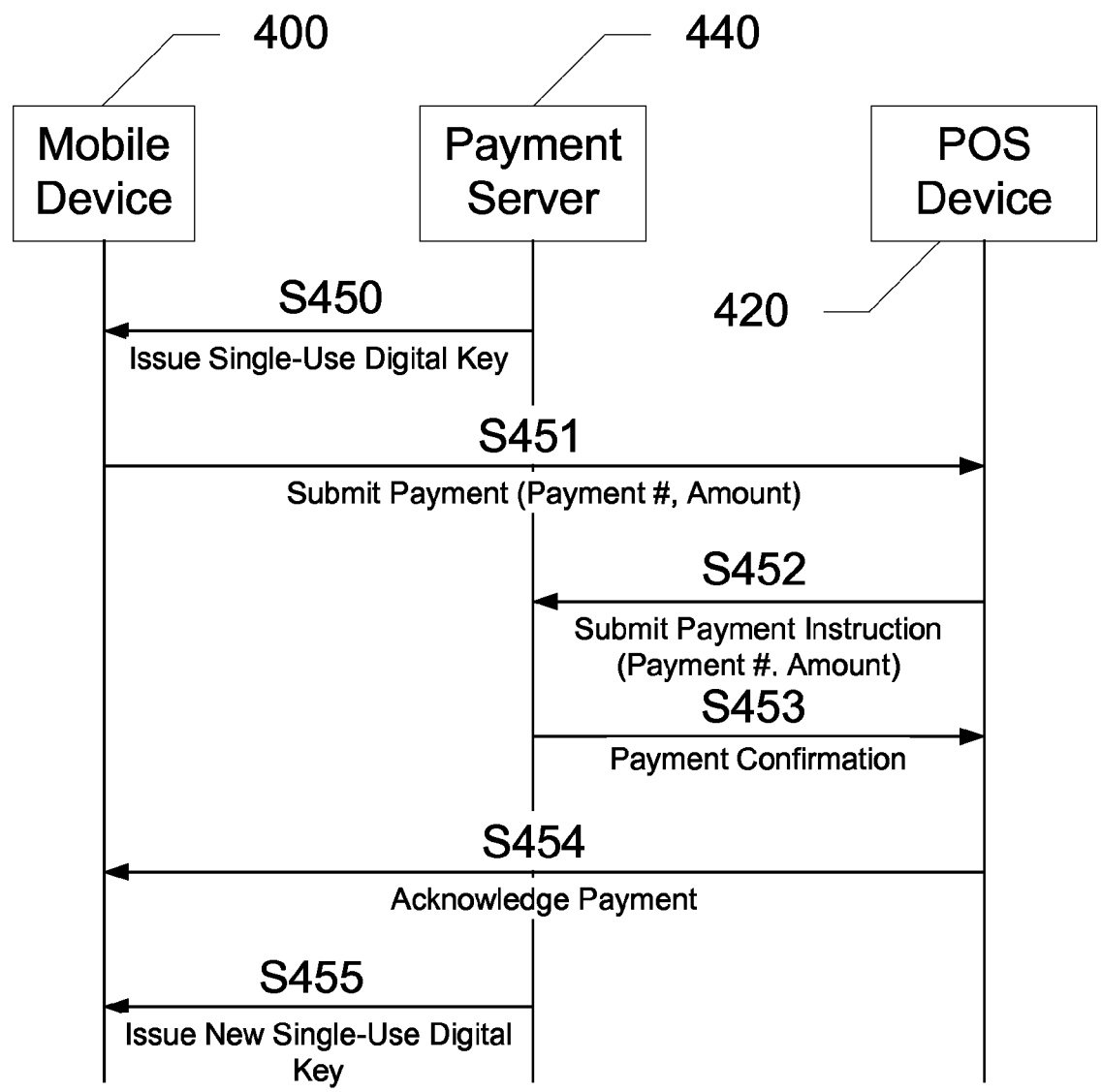
FIG. 4 shows an action diagram of a method of secure payment by a mobile device, according to an exemplary embodiment of the present invention.

FIG. 4 shows an action diagram of a method of secure payment by a mobile device 400, according to an exemplary embodiment of the present invention. In this exemplary embodiment, a payment server 440 issues a one-time digital key S450 to mobile communications device 400. The one-time digital key is stored on mobile communications device 400 until it is used, until it is replaced by a new one-time digital key, for a period of time, etc. Mobile communications device 400 uses the one-time digital key to submit a payment S451 to a point-of-sale (POS) device 420, the payment including a payment number and an amount. The payment may be submitted through a wired or wireless connection. POS device 420 submits payment instructions S452 to payment server 440, the payment instructions including the payment number and the amount. Payment server 440 verifies the payment number and confirms the payment S453 to POS device 420. Payment server deducts the amount from an account associated with mobile communications device 400. POS device 420 then sends an acknowledgement of the payment S454 to mobile device 400. With the payment completed, payment server 440 issues a new one-time digital key S455 to mobile device 400.

In further embodiments, the payment server sends a confirmation of the transaction to the mobile communications device. In some embodiments the customer has set a payment cap on a single transaction. When an amount sent along with a payment number exceeds the payment cap, authorization is required from the customer. A verification is sent to the mobile communications device in the form of a telephone call, text message, etc. In any case, the customer inputs authorization if the customer recognizes the transaction and the payment server completes the transaction. If the customer does not recognize the transaction, the customer denies the transaction and may be permitted to take further action to investigate the transaction.

Figure 5:
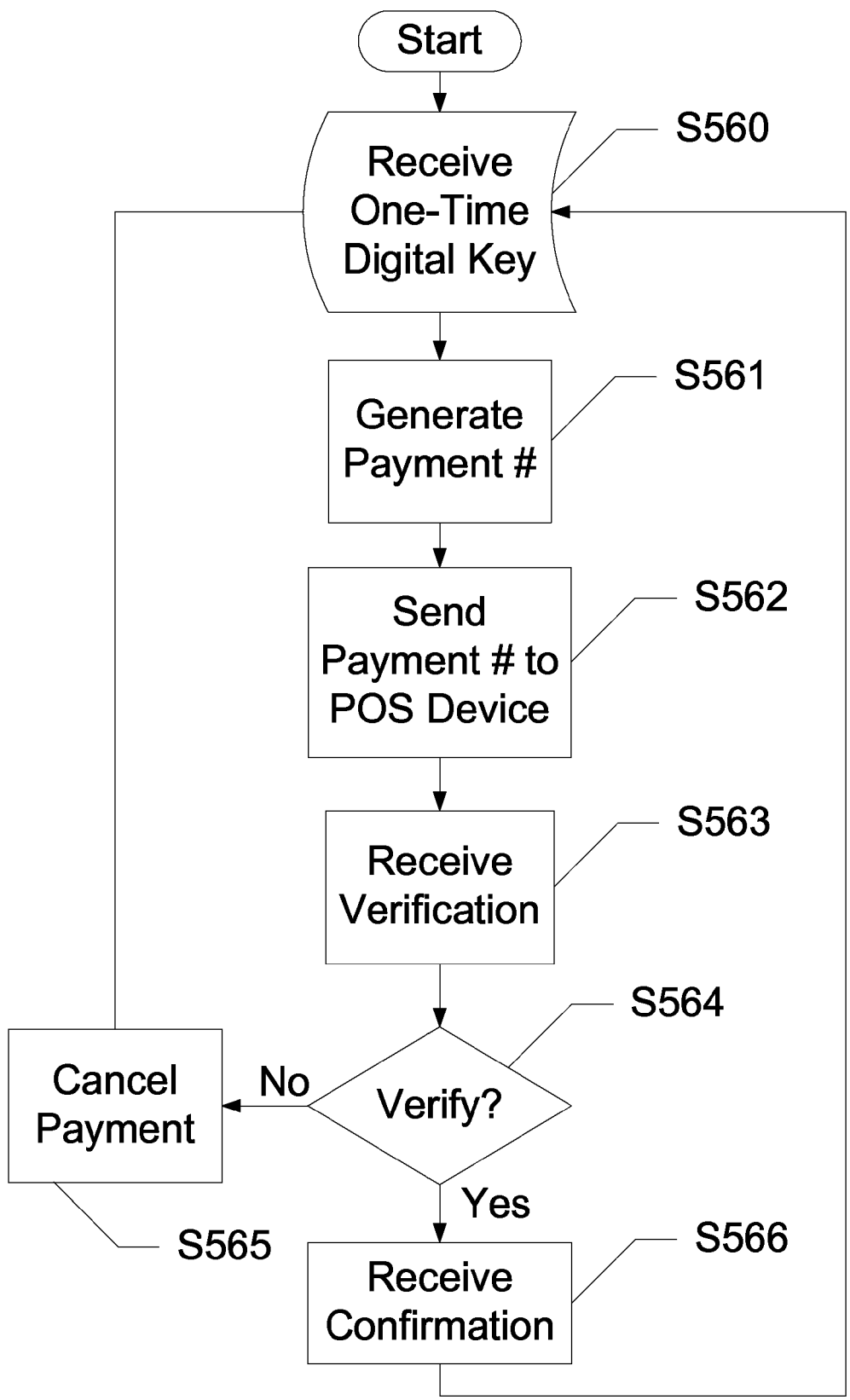
FIG. 5 shows a method of making a secure payment from a mobile communications device that exceeds a payment cap, according to an exemplary embodiment of the present invention.

FIG. 5 shows a method of making a secure payment from a mobile communications device that exceeds a payment cap, according to an exemplary embodiment of the present invention. In this embodiment, the mobile communications device receives a one-time digital key S560. The one-time digital key may be sent by a point-of-sale (POS) device, by a payment server, etc. The mobile communications device uses the one-time digital key and a random number from a random number generator algorithm to generate a payment number S561. The mobile communications device then sends the payment number to the POS device S562. Since the amount exceeds the payment cap, the mobile communications device receives a verification S563. The verification may be a personal telephone call from an agent or some other form of verification. If the customer recognizes the transaction, the customer commands the mobile communications device to verify the transaction S564. If the customer does not recognize the transaction then the customer commands the mobile communications device to cancel the transaction S565. If the transaction is verified, then the mobile communications device receives a confirmation that the payment is accepted S566. This confirmation may come from the POS device, the payment server, etc. In either case, a new one-time digital key is then received by the mobile communications device for use with the next transaction S560.

Figure 6:
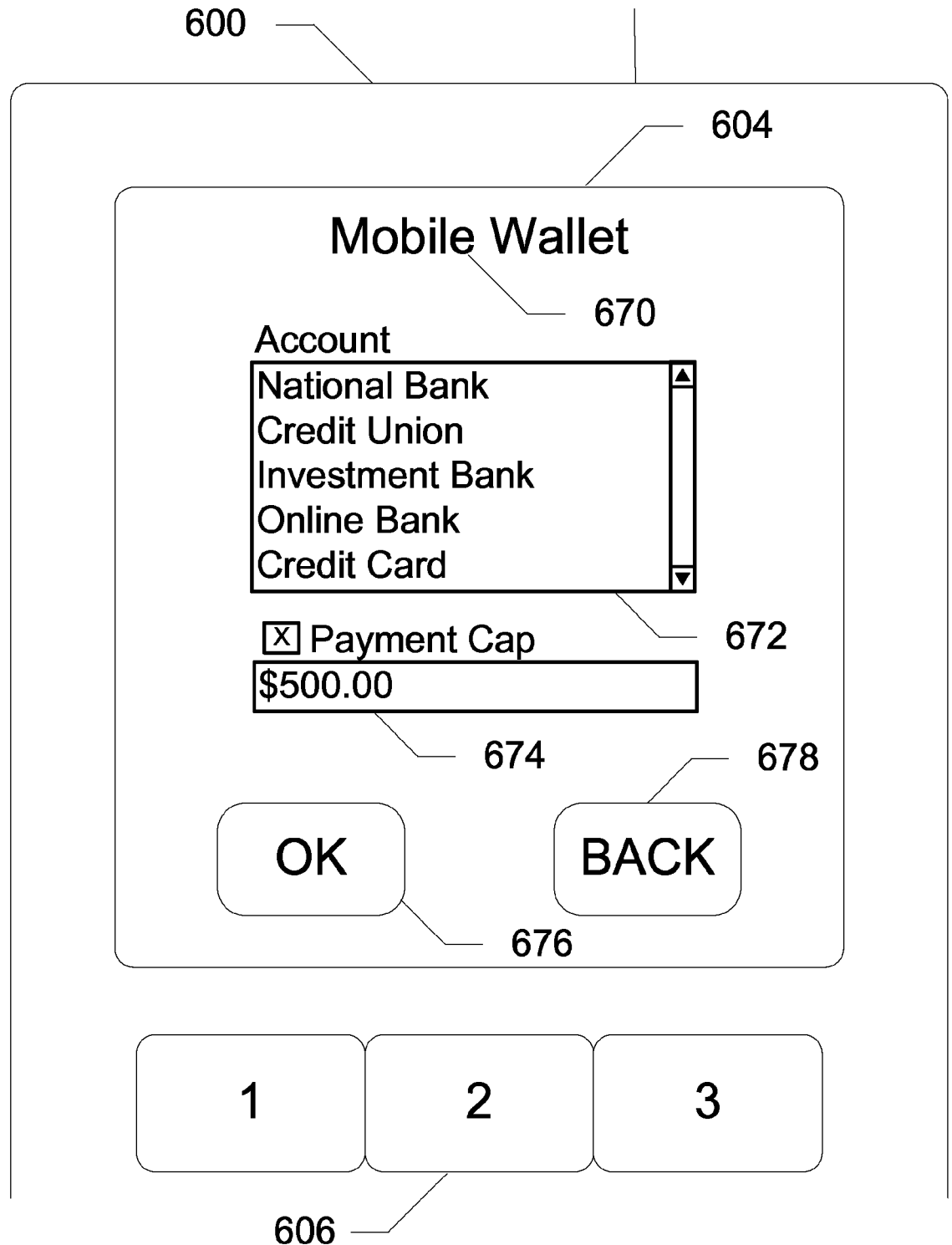
FIG. 6 shows a screenshot of a mobile wallet application on a mobile communications device, according to an exemplary embodiment of the present invention.

FIG. 6 shows a screenshot of a mobile wallet application 670 on a mobile communications device 600, according to an exemplary embodiment of the present invention. In this embodiment, mobile wallet application 670 includes a payment settings feature. An account menu 672 allows a customer to select an account to make payments from. The secure payment application allows the customer to cap transactions using a payment cap field 674. Payment cap field 674 allows the customer to check whether the customer wants transactions capped. If the customer chooses to cap transactions, then the customer enters a cap amount in payment cap field 674. The customer then selects OK button 676 to confirm the settings or BACK button 678 to cancel the settings shown and revert to the previously saved settings. A keypad 606 on mobile communications device 600 along with a display 604 of mobile communications device 600 allows the customer to select and view options on the secure payment application.

Other exemplary embodiments include many more features in the mobile wallet application such as connection settings, encryption type, server settings, etc. Other features of the mobile wallet are disclosed in co-pending U.S. patent application Ser. No. 11/727,493, which is hereby incorporated by reference herein in its entirety.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for securely processing transactions comprising:
    a mobile communications device having a client payment logic, the client payment logic generating a payment number through an addition, a subtraction, a multiplication, an appending, and a mixing of a random number generated by the client logic with a one-time digital key;
    a point-of-sale device in communication with the mobile communications device, the point-of-sale device having a vendor payment logic; the vendor payment logic sending a one-time digital key to the mobile communications device via wireless communication upon determining that the mobile communications device is not connected to a payment server through a cellular network; and
    said payment server in communication with the mobile communications device through the cellular network and the point-of-sale device through a second connection, the payment server having a server payment logic;
    wherein the server payment logic,
        sends the one-time digital key to the mobile communications device upon determination that the mobile communications device is connected to the payment server via a cellular network;
        receives the payment number and an amount from the point-of-sale device, the payment number sent to the point-of-sale device from the mobile communications device;
        disassembles the payment number into the one-time digital key and the random number;
        verifies the one-time digital key;
        generates an identical random number using an identical algorithm to an algorithm used to generate the random number by the client payment logic;
        compares the disassembled random number to the generated identical random number; and
        deducts the amount from an account associated with the mobile communications device based on the result of the comparison.

2. The system in claim 1, wherein the client payment logic sends the payment number and the amount to the point-of-sales device upon generating the payment number after receiving the one-time digital key.

3. The system in claim 1, wherein the mobile communications device is at least one of a cellular telephone, notebook computer, or a personal digital assistant.

4. The system in claim 1, wherein the point-of-sale device is at least one of a cash register or a kiosk.

5. The system in claim 1, wherein the server payment logic extracts the one-time digital key from the payment number.

6. The system in claim 1, wherein the client payment logic sends a payment cap to the payment server.

7. The system in claim 6, wherein the server payment logic requests verification from the mobile communications device in response to receiving an amount that exceeds the payment cap.

8. A method of securely processing a payment comprising:
    sending, by a server payment logic located on a payment server, a one-time digital key to a mobile communications device, the mobile communication device in communication with the payment server over a cellular network;
    sending, by a vendor payment logic located on a point-of-sale device, the one-time digital key to a mobile communications device via wireless communication upon determining that the mobile communications device is not connected to the payment server over the cellular network;
    generating, by a client payment logic of the mobile communication device, a payment number through adding, subtracting, multiplying, appending and mixing of the one-time digital key and a random number generated by the mobile communication device;

receiving, at the payment server, the payment number generated by the mobile communications device, an identification number, and an amount from the point-of-sale device; the payment number, identification number and amount sent to the point-of-sale device from the mobile communications device;

disassembling, by the payment server, the payment number into the one-time digital key and the random number; and deducting, using the payment server, the amount from an account associated with the mobile communications device upon verifying the random number and the one-time digital key obtained from disassembling the payment number into the one-time digital key and the random number, the verifying of the random number accomplished by the payment server generating an identical random number using an identical algorithm to an algorithm used to generate the random number on the mobile communications device and comparing the random number and the identical random number.

9. The method in claim 8, further comprising sending a confirmation corresponding to the deduction to the mobile communications device.

10. The method in claim 8, further comprising sending a new one-time digital key to the mobile communications device.

11. The method in claim 8, further comprising receiving a payment cap from the mobile communications device.

12. The method in claim 11, further comprising requesting verification for an amount that exceeds the payment cap.

13. The method in claim 12, further comprising receiving verification from the mobile communications device.

14. A method of securely processing a payment comprising:

receiving a one-time digital key, at a mobile communications device, from a server payment logic located on a payment server and a vendor payment logic located on a point-of-sale device, the one-time digital key received from the vendor payment logic of the point-of-sale device upon determining that the mobile communications device is not connected to the payment server via a cellular network;

sending, by the point-of-sale device, a payment number, an identification number, and an amount to a payment server, the payment number generated using a client payment logic of the mobile communications device, the client payment logic adding, subtracting, multiplying, appending, and mixing the one-time digital key with a random number generated by the mobile communications device;

wherein the point-of-sale device receives the payment number, identification number and the amount from the mobile communications device;

wherein the payment server verifies the random number and the one-time digital key, the verifying of the random number accomplished by the payment server generating an identical random number using an identical algorithm to an algorithm used to generate the random number on the mobile communications device and comparing the random number and the identical random number, and deducting, by the payment server, the amount from an account associated with the mobile communications device.

15. The method in claim 14, further comprising combining the one-time digital key with a random number into the payment number.

16. The method in claim 14, further comprising receiving a confirmation corresponding to the deduction from the payment server.

17. The method in claim 14, further comprising receiving a new one-time digital key from the payment server.

18. The method in claim 14, further comprising sending a payment cap to the payment server.

19. The method in claim 18, further comprising receiving a verification request for an amount that exceeds the payment cap.

\* \* \* \* \*